(12) United States Patent
Brennan et al.

(10) Patent No.: US 7,785,680 B2
(45) Date of Patent: *Aug. 31, 2010

(54) MULTILAYER CARD

(75) Inventors: William James Brennan, Middlesbrough (GB); Gary Victor Rhoades, Stockton-On-Tees (GB); Paul David Lawrence, Middlesbrough (GB)

(73) Assignee: Dupont Teijin Films U.S. Limited Partnership, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/801,100

(22) Filed: May 7, 2007

(65) Prior Publication Data

US 2007/0218223 A1  Sep. 20, 2007

Related U.S. Application Data

(60) Division of application No. 10/897,195, filed on Jul. 22, 2004, now Pat. No. 7,232,602, which is a continuation of application No. 09/155,842, filed on Apr. 6, 2001, now abandoned.

(51) Int. Cl.
*B41M 5/40* (2006.01)
*B41M 5/00* (2006.01)
*B44C 1/17* (2006.01)
*G03G 7/00* (2006.01)

(52) U.S. Cl. .............. 428/32.39; 428/195.1; 428/212; 428/213

(58) Field of Classification Search .............. 428/32.39, 428/195.1, 212, 213, 500
See application file for complete search history.

(56) References Cited

U.S. PATENT DOCUMENTS

| 3,793,029 A | 2/1974 | Parker |
| 4,454,312 A | 6/1984 | Kuze et al. |
| 4,510,205 A | 4/1985 | Weemes et al. ............. 428/483 |
| 5,215,814 A | 6/1993 | Gager et al. ................. 428/331 |
| 5,358,582 A | 10/1994 | Koshizuka et al. ........... 156/235 |
| 5,407,893 A * | 4/1995 | Koshizuka et al. ........... 503/227 |
| 5,614,289 A | 3/1997 | Kobayashi et al. |

(Continued)

FOREIGN PATENT DOCUMENTS

EP  0 437 942 A2 *  7/1991

(Continued)

OTHER PUBLICATIONS

Okawachi, et al., Photograph Card, JP 01-205155A, Aug. 17, 1989 (Certified, Full Transation—USPTO).*

*Primary Examiner*—Mark Ruthkosky
*Assistant Examiner*—David J Joy
(74) *Attorney, Agent, or Firm*—RatnerPrestia

(57) ABSTRACT

A multilayer card has (i) an opaque polyester film substrate containing 0.2 to 30% by weight, relative to the total weight of the substrate, of at least one copolyesterether, (ii) a first ink-receptive layer on at least one surface of the substrate, (iii) a cover layer on the surface of the ink-receptive layer and/or surface of the substrate and (iv) a second ink-receptive heat-sealable layer comprising a polyester resin on a second surface of the substrate. The presence of the copolyesterether in the substrate reduces the tendency of the card to delaminate in use. Suitable for use, inter alia, in identification, magnetic, credit, pre-paid and smart cards.

50 Claims, 1 Drawing Sheet

U.S. PATENT DOCUMENTS

| | | | |
|---|---|---|---|
| 5,753,352 A | 5/1998 | Vanmaele et al. | |
| 5,800,911 A | 9/1998 | Sankey et al. | |
| 5,912,085 A | 6/1999 | Ito et al. | |
| 6,114,047 A * | 9/2000 | Ohta | 428/32.38 |
| 7,232,602 B2 * | 6/2007 | Brennan et al. | 428/212 |

FOREIGN PATENT DOCUMENTS

| | | | |
|---|---|---|---|
| JP | 01-205155 | * | 8/1989 |
| JP | 03230995 | | 10/1991 |
| JP | 05169604 | | 7/1993 |
| JP | 06226894 | | 8/1994 |
| JP | 07040690 | | 2/1995 |
| JP | 07266757 | | 10/1995 |
| JP | 07299977 | | 11/1995 |

* cited by examiner

MULTILAYER CARD

This application is a Divisional Application of Ser. No. 10/897,195, filed Jul. 22, 2004 now U.S. Pat. No. 7,232,602, which is a continuation of application Ser. No. 09/155,842 filed Apr. 6, 2001 now abandoned.

This invention relates to a multilayer card such as an identification, credit or magnetic card, and in particular to a multilayer card comprising an opaque polyester film substrate.

Polyester films, such as polyethylene terephthalate, are of utility in a wide range of applications including magnetic recording media—such as tapes and discs, as supporting substrates for light-sensitive emulsions, pressure-sensitive adhesives and metal layers, as decorative drapes, electrical insulants, packaging films and cards.

Polyester films have been used. In the production of an identification or magnetic card, such as a credit card, and in particular a "pre-paid card", eg a telephone card, and a "smart card", which is, for example, capable of storing information relating to a number of financial transactions. Such cards are usually constructed of multiple sheets of the same, eg all polyester, or different materials, eg alternative sheets of polyester, such as polyethylene terephthalate and PETG, polycarbonate, polyolefin, polyvinyl chloride, ABS resin or paper. A card preferably contains at least one opaque layer. We have discovered that the presence of an opaque polyester film in a multilayer card results in a tendency of the card to delaminate in use, with subsequent peeling of the layers.

Copolyesterethers have been used in polyester films to improve the flex-crack resistance thereof. EP-A-0437942 describes a transparent polyester film containing a copolyesterether which is suitable for use in packaging applications.

We have now devised a multilayer card comprising an opaque polyester film substrate which exhibits improved resistance to delamination.

Accordingly, the present invention provides a multilayer card comprising (I) an opaque polyester film substrate comprising in the range from 0.2 to 30% by weight, relative to the total weight of the substrate, of at least one copolyesterether, (ii) an ink-receptive layer on at least one surface of the substrate, and (iii) a cover layer on the surface of the ink-receptive layer and/or surface of the substrate.

The invention also provides a method of producing a multilayer card which comprises forming an opaque substrate by extruding a layer of molten linear polyester comprising an opacifying agent and in the range from 0.2 to 30% by weight, relative to the total weight of the substrate, of at least one copolyesterether, quenching the extrudate, orienting the quenched extrudate in at least one direction, forming an ink receptive layer on at least one surface of the substrate, applying pictorial and/or written information on the surface of the ink-receptive layer, and forming a cover layer on the surface of the information carrying ink receptive layer and/or surface of the substrate.

The polyester film substrate is a self-supporting film by which is meant a self-supporting structure capable of independent existence in the absence of a supporting base.

A polyester suitable for use in the formation of a substrate layer is preferably a synthetic linear polyester and may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxy-ethane (optionally with a monocarboxylic acid, such as pivalic acid) with one or more glycols, particularly an aliphatic or cycloaliphatic glycol, eg ethylene glycol, 1,3-propanediol, 1,4-butanediol, neopentyl glycol and 1,4-cyclohexane dimethanol. A polyethylene terephthalate or polyethylene naphthalate film is preferred. A polyethylene terephthalate film is particularly preferred, especially such a film which has been biaxially oriented by sequential stretching in two mutually perpendicular directions, typically at a temperature in the range from 70 to 125° C., and preferably heat set, typically at a temperature in the range from 150 to 250° C., for example as described in GB-A-838708.

The polyester substrate may be unoriented, or preferably oriented, for example uniaxially oriented, or more preferably biaxially oriented by drawing in two mutually perpendicular directions in the plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics material as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched substrate film may be, and preferably is, dimensionally stabilised by heat-setting under dimensional restraint at a temperature above the glass transition temperature thereof.

A copolyesterether employed in the present invention is preferably a block copolymer comprising predominantly a polyester block as a hard segment, and a polyether block as a soft segment.

The hard polyester block is suitably formed by condensing one or more dicarboxylic acids, or ester derivatives or ester forming derivatives thereof, with one or more glycols. The dicarboxylic acid or derivative thereof may be aliphatic, cycloaliphatic or aromatic. Suitable aliphatic or cycloaliphatic dicarboxylic acids include 1,3- or 1,4-cyclohexane dicarboxylic, adipic, glutaric, succinic, carbonic, oxalic and azelaic acids. Aromatic dicarboxylic acids are preferred and include terephthalic, isophthalic, phthalic, bibenzoic and naphthalenedicarboxylic acids, and the dimethyl derivatives thereof. The glycol component may also be aliphatic, cycloaliphatic or aromatic. The glycol is preferably aliphatic or cycloaliphatic. Suitable glycols include ethylene glycol, 1,3-propanediol, 1,4-butanediol, neopentyl glycol, 1,6-hexanediol and 1,4-cyclohexane dimethanol.

The polyester block preferably comprises at least one alkylene terephthalate, for example ethylene terephthalate, butylene terephthalate and/or hexylene terephthalate. Butylene terephthalate is particularly preferred. The molecular weight of the polyester block is preferably less than 15,000, more preferably in the range from 440 to 10,000, particularly 660 to 3000, and especially 880 to 1500.

The soft polyether block is a polymeric glycol suitably formed from one or more glycols such as ethylene glycol, 1,2- or 1,3-propanediol, 1,4-butanediol, neopentyl glycol, 1,6-hexanediol and 1,4-cyclohexane dimethanol. The polyether block is preferably a poly(alkylene oxide) glycol, for example poly(ethylene oxide) glycol, poly(1,2-and 1,3-propylene oxide) glycol, poly(tetramethylene oxide) glycol, and random or block copolymers of ethylene oxide and propylene oxide. Poly(tetramethylene oxide) glycol is a preferred component of the polyether block. The molecular weight of the polyether, preferably poly(tetramethylene oxide) glycol, block is preferably in the range from 350 to 10,000, more preferably 600 to 5000, particularly 900 to 2000, and especially 1200 to 1800. In a particularly preferred embodiment of the invention, the copolyesterether comprises, as the soft polyether block, a mixture of poly(tetramethylene oxide) glycol and poly(propylene oxide) glycol, suitably in a ratio of from 1 to 20:1, preferably 5 to 15:1, and more preferably 8 to 12:1. The molecular weight of the poly(propylene oxide) glycol is preferably in the range from 1000 to 5000, more preferably 2000 to 3000.

The ratio of hard:soft block in the copolyesterether is preferably in the range from 10 to 95:5 to 90, more preferably 25 to 55:45 to 75, and particularly 35 to 45:55 to 65 weight %.

In a preferred embodiment of the invention the copolyesterether is dried prior to polyester film substrate formation and/or prior to incorporation in the substrate layer composition. The copolyesterether may be dried in isolation, or after mixing with one or more of the other components of the substrate layer, eg dried after mixing with the opacifying agent, preferably inorganic filler, more preferably titanium dioxide. The copolyesterether may be dried by conventional means, for example in a fluidised bed, or in an oven, at elevated temperature, under vacuum or by passing through an inert gas, eg nitrogen. The water content of the copolyesterether prior to extrusion of the film forming substrate layer composition and subsequent film formation is suitably in the range from 0 to 800 ppm, preferably 25 to 600 ppm, more preferably 50 to 400 ppm, particularly 100 to 300 ppm, and especially 150 to 250 ppm.

The amount of copolyesterether present in the polyester substrate is preferably in the range from 1 to 20, more preferably 3 to 15, particularly 5 to 12, and especially 6 to 10% by weight, relative to the total weight of the substrate layer. The amount of polyether present in the polyester substrate is preferably in the range from 0.5 to 15, more preferably 1 to 5, and particularly 2 to 4% by weight, relative to the total weight of the substrate layer.

The copolyesterether employed in the present invention preferably has a flexural modulus (measured at 23° C. according to ASTM D790) of 200 MPa or less, and more preferably in the range from 50 to 100 MPa. In addition, preferred copolyesterethers have a Shore hardness (measured at 23° C. on the D scale according to DIN 53505) of 60 or less, particularly in the range from 35 to 45.

The copolyesterethers can be prepared by conventional polymerisatlon techniques, which are well known to those skilled in the art.

The polyester substrate is opaque, by which is meant substantially impermeable to light, and preferably exhibits a Transmission Optical Density (TOD) (Macbeth Densitometer; type TD 902; transmission mode) in the range from 0.6 to 1.75, more preferably 0.8 to 1.6, particularly 1.0 to 1.5, and especially 1.1 to 1.4. The aforementioned TOD ranges are particularly applicable to a 300 µm thick substrate.

The polyester substrate is preferably white and suitably exhibits a whiteness index, measured as herein described, of greater than 85, more preferably in a range from 90 to 105, particularly 92 to 100, and especially 94 to 98 units.

The polyester substrate preferably exhibits a yellowness index, measured as herein described, of less than or equal to 3, more preferably in the range from −10 to 0, particularly −8 to −3, and especially −7 to −5.

The polyester substrate is conveniently rendered opaque by incorporation into the synthetic polyester of an effective amount of an opacifying agent. Suitable opacifying agents include an incompatible resin filler, a particulate inorganic filler or a mixture of two or more such fillers.

By an "incompatible resin" is meant a resin which either does not melt, or which is substantially immiscible with the polyester, at the highest temperature encountered during extrusion and fabrication of the layer. The presence of an incompatible resin usually results in a voided film, by which is meant that the film comprises a cellular structure containing at least a proportion of discrete, closed cells. Suitable incompatible resins include polyamides and olefin polymers, particularly a homo- or co-polymer of a mono-alpha-olefin containing up to 6 carbon atoms in its molecule, for incorporation into a polyester film. For incorporation into a polyethylene terephthalate film, suitable materials include a low or high density olefin homopolymer, particularly polyethylene, polypropylene or poly-4-methylpentane-1, an olefin copolymer, particularly an ethylene-propylene copolymer, or a mixture of two or more thereof. Random, block or graft copolymers may be employed.

The amount of incompatible resin filler present in the polyester substrate is preferably within the range from 2 to 30, more preferably 3 to 20, especially 4 to 15, and particularly 5 to 10% by weight, relative to the total weight of the substrate layer.

Particulate inorganic fillers suitable for generating an opaque polyester substrate include conventional inorganic pigments and fillers, and particularly metal or metalloid oxides, such as alumina, silica and titania, and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the substrate polyester.

In a preferred embodiment of the invention the polyester substrate has a degree of voiding in the range from 0 to 15, more preferably 0.01 to 10, particularly 0.05 to 5, and especially 0.1 to 1% by volume. Thus, the polyester substrate is preferably substantially free of voids. The degree of voiding can be determined, for example, by sectioning the film using scanning electron microscopy, and measuring the voids by image analysis. The density of the polyester substrate is preferably in the range from 1.2 to 1.5, more preferably 1.3 to 1.45, and particularly 1.35 to 1.4.

In a particularly preferred embodiment of the invention, the particulate inorganic filler comprises titanium dioxide. Substantially non-voiding titanium dioxide is preferred.

The individual or primary inorganic filler, preferably titanium dioxide, particles suitably have a mean crystal size, as determined by electron microscopy, in the range from 0.05 to 0.4 µm, preferably from 0.1 to 0.2 µm, and more preferably of approximately 0.15 µm. In a preferred embodiment of the invention, the primary inorganic filler, preferably titanium dioxide, particles aggregate to form clusters or agglomerates comprising a plurality of inorganic filler particles. The aggregation process of the primary inorganic filler particles may take place during the actual synthesis of the filler and/or during the polyester and film making process.

The aggregated inorganic filler particles preferably have a volume distributed median particle diameter (equivalent spherical diameter corresponding to 50% of the volume of all the particles, read on the cumulative distribution curve relating volume % to the diameter of the particles—often referred to as the "D(v,0.5)" value), as determined by laser diffraction, in the range from 0.3 to 1.5 µm, more preferably 0.4 to 1.2 µm, and particularly 0.5 to 0.9 µm.

The size distribution of the inorganic filler particles is also an important parameter, for example the presence of excessively large particles can result in the film exhibiting unsightly 'speckle', ie where the presence of filler aggregates in the film can be discerned with the naked eye. It is preferred that none of the inorganic filler incorporated into the substrate should have an actual particle size exceeding 30 µm. Particles exceeding such a size may be removed by sieving processes which are known in the art. However, sieving operations are not always totally successful in eliminating all particles greater than a chosen size. In practice, therefore, the size of 99.9% by number of the inorganic filler particles should not exceed 30 µm, preferably should not exceed 20 µm, and more preferably should not exceed 10 µm. Preferably at least 90%, more preferably at least 95% of the inorganic filler particles are within the range of the volume distributed median particle diameter ±0.5 µm, and particularly ±0.3 µm.

The amount of inorganic filler incorporated into the polyester substrate desirably should be in the range from 5 to 25, more preferably 10 to 25, particularly 12 to 20, and especially 14 to 16% by weight, relative to the total weight of the substrate layer.

The preferred titanium dioxide particles may be of anatase or rutile crystal form. The titanium dioxide particles preferably comprise a major portion of anatase, more preferably at least 60%, particularly at least 80%, and especially approximately 100% by weight of anatase. The particles can be prepared by standard procedures, such as using the chloride process or preferably by the sulphate process.

In one embodiment of the invention the titanium dioxide particles are coated preferably with inorganic oxides such as aluminium, silicon, zinc, magnesium or mixtures thereof. Preferably the coating additionally comprises an organic compound, such as fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds.

The coating is applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate.

Particle size of the filler particles described herein may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile. The volume distributed median particle diameter of the filler particles is suitably measured using a Malvern Instruments Mastersizer MS 15 Particle Sizer after dispersing the filler in ethylene glycol in a high shear (eg Chemcoll) mixer.

In one embodiment of the invention, the polyester substrate comprises an optical brightener. The optical brightener is preferably added in amounts in the range from 50 to 1500 ppm, more preferably 200 to 1000 ppm, and especially 400 to 600 ppm by weight, relative to the weight of the substrate polyester. Suitable optical brighteners include those available commercially under the trade names "Uvitex" MES, "Uvitex" OB, "Leucopur" EGM and "Eastobrite" OB-1.

In a preferred embodiment of the invention, the polyester substrate comprises a blue dye, preferably in amounts in the range from 100 to 3000 ppm, more preferably 200 to 2000 ppm, and especially 300 to 1000 ppm by weight, relative to the weight of the substrate polyester.

The optical brightener and/or blue dye may be included at any stage of the polyester or polyester film production. Preferably the optical brightener and/or blue dye is added to the glycol, or alternatively by subsequent addition to the polyester prior to the formation of the polyester film, eg by injection during extrusion.

The thickness of the polyester substrate is preferably in the range from 25 to 400 µm, more preferably 100 to 350 µm, particularly 250 to 320 µm, and especially 280 to 310 µm.

The components of the substrate layer composition may be mixed together in conventional manner. For example, by mixing with the monomeric reactants from which the polyester is derived, or the components may be mixed with the polyester by tumble or dry blending or by compounding in an extruder, followed by cooling and, usually, commination into granules or chips. The copolyesterether may be fed separately to the extruder from which the linear polyester is extruded to form the substrate layer.

The ink-receptive layer is preferably a polymeric coating layer which functions to improve the adhesion of inks, dyes and/or lacquers etc to the polyester substrate. The ink-receptive layer preferably comprises at least one ink-receptive polymer. The ink-receptive layer may carry pictorial information, such as an ordinary photograph, and/or written information such as typed script, a signature etc, as appropriate. The ink-receptive layer may be printed on by means of traditional printing processes such as off-set, gravure, silk screen, and flexographic printing, or by writing by hand, or by thermal transfer printing (TTP), or by laser transfer printing (LTP). The chemical composition of the ink-receptive layer may vary over a wide range, and suitable materials include polyesters, polyurethanes, acrylics and styrene-containing polymers.

In one embodiment of the invention the ink-receptive layer suitably comprises a polyester resin, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Typical copolyesters which provide satisfactory properties are those of ethylene terephthalate and ethylene isophthalate, especially in the molar ratios of from 50 to 90 mole % ethylene terephthalate and correspondingly from 50 to 10 mole % ethylene isophthalate. Preferred copolyesters comprise from 65 to 85 mole % ethylene terephthalate and from 35 to 15 mole % ethylene isophthalate, and especially a copolyester of about 82 mole % ethylene terephthalate and about 18 mole % ethylene isophthalate.

The polyester ink-receptive layer may be applied from an organic or aqueous solvent, to an already oriented polyester substrate, or more preferably before or during the stretching operation. Alternatively, the polyester ink-receptive layer may be formed by casting the ink-receptive polyester onto a preformed substrate layer. Conveniently, however, formation of a composite sheet (polyester substrate and polyester ink-receptive layer) is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polyesters are first united within a channel leading to a die manifold, and thereafter extruded together from the die orifice under conditions of streamline flow without intermixing thereby to produce a composite sheet.

A coextruded sheet is stretched to effect molecular orientation of the substrate, and preferably heat-set. Generally, the conditions applied for stretching the substrate layer will induce partial crystallisation of the ink-receptive polyester and it is therefore preferred to heat set under dimensional restraint at a temperature selected to develop the desired morphology of the ink-receptive layer. Thus, by effecting heat-setting at a temperature below the crystalline melting temperature of the ink-receptive polyester and permitting or causing the composite to cool, the ink-receptive polyester will remain essentially crystalline. However, by heat-setting at a temperature greater than the crystalline melting temperature of the ink-receptive polyester, the latter will be rendered essentially amorphous. Heat-setting of a composite sheet comprising a polyester substrate and a copolyester ink-receptive layer is conveniently effected at a temperature within a range of from 175 to 200° C. to yield a substantially crystalline ink-receptive layer, or from 200 to 250° C. to yield an essentially amorphous ink-receptive layer. An essentially amorphous ink-receptive layer is preferred.

In a preferred embodiment of the invention the polyester ink-receptive layer also exhibits heat-sealing properties, ie should be capable of forming a heat-seal bond to itself and/or to the polyester substrate and/or to the cover layer as described herein, by heating to soften the polyester material of the ink-receptive layer and applying pressure without softening or melting the polyester material of the substrate layer. The polyester ink-receptive layer preferably exhibits a heat-seal strength, measured by sealing the layer to itself, in the range from 300 to 3000, more preferably 1000 to 2500, and particularly 1800 to 2200 $Nm^{-1}$.

The thickness of the polyester ink-receptive layer may vary over a wide range but generally will not exceed 50 µm, and is preferably within a range of from 0.5 to 25 µm, and more preferably from 3 to 15 µm.

In an alternative embodiment of the invention, the ink-receptive layer comprises an acrylic resin, by which is meant a resin which comprises at least one acrylic and/or methacrylic component.

The acrylic resin component of the ink-receptive layer is suitably thermoset and preferably comprises at least one monomer derived from an ester of acrylic acid and/or an ester of methacrylic acid, and/or derivatives thereof. In a preferred embodiment of the invention, the acrylic resin comprises greater than 50 mole %, preferably less than 98 mole %, more preferably in the range from 60 to 97 mole %, particularly 70 to 96 mole %, and especially 80 to 94 mole % of at least one monomer derived from an ester of acrylic acid and/or an ester of methacrylic acid, and/or derivatives thereof. A preferred acrylic resin comprises an alkyl ester of acrylic and/or methacrylic acid where the alkyl group contains up to ten carbon atoms such as methyl, ethyl, n-propyl, isopropyl, n-butyl, isobutyl, terbutyl, hexyl, 2-ethylhexyl, heptyl, and n-octyl. Polymers derived from an alkyl acrylate, for example ethyl acrylate and butyl acrylate, together with an alkyl methacrylate are preferred. Polymers comprising ethyl acrylate and methyl methacrylate are particularly preferred. The acrylate monomer is preferably present in a proportion in the range from 30 to 65 mole %, and the methacrylate monomer is preferably present in a proportion in the range from 20 to 60 mole %.

Other monomers which are suitable for use in the preparation of the acrylic resin of the ink-receptive layer, which may be preferably copolymerised as optional additional monomers together with esters of acrylic acid and/or methacrylic acid, and/or derivatives thereof, include acrylonitrile, methacrylonitrile, halo-substituted acrylonitrile, halo-substituted methacrylonitrile, acrylamide, methacrylamide, N-methylol acrylamide, N-ethanol acrylamide, N-propanol acrylamide, N-methacrylamide, N-ethanol methacrylamide, N-methyl acrylamide, N-tertiary butyl acrylamide, hydroxyethyl methacrylate, glycidyl acrylate, glycidyl methacrylate, dimethylamino ethyl methacrylate, itaconic acid, itaconic anhydride and half esters of itaconic acid.

Other optional monomers of the acrylic ink-receptive layer polymer include vinyl esters such as vinyl acetate, vinyl chloroacetate and vinyl benzoate, vinyl pyridine, vinyl chloride, vinylidene chloride, maleic acid, maleic anhydride, styrene and derivatives of styrene such as chloro styrene, hydroxy styrene and alkylated styrenes, wherein the alkyl group contains from one to ten carbon atoms.

A preferred acrylic resin, derived from 3 monomers comprises 35 to 60 mole % of ethyl acrylate/30 to 55 mole % of methyl methacrylate/2 to 20 mole % of methacrylamide, and especially comprising approximate molar proportions 46/46/8% respectively of ethyl acrylate/methyl methacrylate/acrylamide or methacrylamide, the latter polymer being particularly effective when thermoset, for example in the presence of about 25 weight % of a methylated melamine-formaldehyde resin.

A preferred acrylic resin, derived from 4 monomers comprises a copolymer comprising comonomers (a) 35 to 40 mole % alkyl acrylate, (b) 35 to 40 mole % alkyl methacrylate, (c) 10 to 15 mole % of a monomer containing a free carboxyl group, and (d) 15 to 20 mole % of a monomer containing a sulphonic acid group and/or a salt thereof. Ethyl acrylate is a particularly preferred monomer (a) and methyl methacrylate is a particularly preferred monomer (b). Monomer (c) containing a free carboxyl group, ie a carboxyl group other than those involved in the polymerisation reaction by which the copolymer is formed, suitably comprises a copolymerisable unsaturated carboxylic acid, and is preferably selected from acrylic acid, methacrylic acid, maleic acid, and/or itaconic acid; with acrylic acid and itaconic acid being particularly preferred. The sulphonic acid group monomer (d) may be present as the free acid and/or a salt thereof, for example as the ammonium, substituted ammonium, or an alkali metal, such as lithium, sodium or potassium, salt. The sulphonate group does not participate in the polymerisation reaction by which the adherent copolymer resin is formed. The sulphonic acid group monomer is preferably aromatic, and more preferably is p-styrene sulphonic acid and/or a salt thereof.

The weight average molecular weight of the acrylic, resin can vary over a wide range but is preferably in the range from 10,000 to 10,00,000, and more preferably 50,000 to 200,000.

The acrylic resin component of the ink-receptive layer preferably comprises at least 30%, more preferably in the range from 40 to 99%, particularly 50 to 85%, and especially 70 to 80% by weight relative to the total weight of the ink-receptive layer. The acrylic resin is generally water-insoluble. The ink-receptive coating composition including the water-insoluble acrylic resin may nevertheless be applied to the polyester film substrate as an aqueous dispersion.

If desired, the acrylic ink-receptive layer coating composition may also contain a cross-linking agent which functions to cross-link the layer thereby improving adhesion to the polyester film substrate. Additionally, the cross-linking agent should preferably be capable of internal cross-linking in order to provide protection against solvent penetration. Suitable cross-linking agents may comprise epoxy resins, alkyd resins, amine derivatives such as hexamethoxymethyl melamine, and/or condensation products of an amine, eg melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines, with an aldehyde, eg formaldehyde. A useful condensation product is that of melamine with formaldehyde. The condensation product may optionally be alkoxylated. The cross-linking agent may suitably be used in amounts of up to 70%, preferably in the range from 1 to 60%, more preferably 15 to 50%, and especially 20 to 30% by weight relative to the total weight of the ink-receptive layer. A catalyst is also preferably employed to facilitate cross-linking action of the cross-linking agent. Preferred catalysts for cross-linking melamine formaldehyde include para toluene sulphonic acid, maleic acid stabilised by reaction with a base, morpholinium paratoluene sulphonate, and ammonium nitrate.

The acrylic ink-receptive layer coating composition may be applied before, during or after the stretching operation in the production of an oriented film. The coating composition is preferably applied to the film substrate between the two stages (longitudinal and transverse) of a thermoplastics polyester film biaxial stretching operation. Such a sequence of stretching and coating is suitable for the production of an ink-receptive layer coated linear polyester film, particularly polyethylene terephthalate film, substrate, which is preferably firstly stretched in the longitudinal direction over a series of rotating rollers, coated, and then stretched transversely in a stenter oven, preferably followed by heat setting.

An acrylic ink-receptive layer coated polyester, especially polyethylene terephthalate, substrate is suitably heated up to 240° C., preferably up to 220° C., in order to dry the aqueous medium, or the solvent in the case of solvent-applied compositions, and also to assist in coalescing and forming the coating into a continuous and uniform layer. The cross-linking of cross-linkable coating compositions is also achieved at such temperatures.

The acrylic ink-receptive layer coating composition is preferably applied to the polyester film substrate by any suitable conventional technique such as dip coating, bead coating, reverse roller coating or slot coating.

The acrylic ink-receptive layer is preferably applied to the polyester film substrate at a dry coat weight. In the range from 0.05 to 5 mgdm$^{-2}$, especially 0.1 to 2.0 mgdm$^{-2}$. The thickness of the dry acrylic ink-receptive layer is preferably less than 1.5 µm, more preferably in the range from 0.01 to 1.0 µm, and particularly 0.02 to 0.5 µm.

In a particularly preferred embodiment, the opaque polyester substrate has a polyester ink-receptive layer, as described herein, on a first surface thereof, and an acrylic ink-receptive layer, as described herein, on a second surface thereof.

The chemical composition of the cover layer component of a multilayer card, according to the present invention may vary over a wide range, and is suitably selected from materials which include polyester, such as polyethylene terephthalate and PETG, polycarbonate, polyolefin, polyvinyl chloride, ABS resin and/or paper. The cover layer is preferably a self-supporting film. Indeed, the cover layer may even be the major contributor to the total thickness of the multilayer card. The function of the cover layer, in addition to the support it provides for the overall card, is to provide protection, including security, for example for the ink-receptive layer and the information contained thereon. The cover layer may have more than one layer, preferably is a multilayer polymeric film, and for example may be an opaque polyester substrate having an ink-receptive layer as described herein. A multilayer card may be formed by laminating together two or more opaque polyester films by means, of heat-sealing their respective polyester ink-receptive layers. Alternatively, non-heat-sealing ink-receptive layers may be laminated together by means of an additional adhesive layer. In a preferred embodiment of the invention the cover layer is transparent in order that the information contained on the ink-receptive layer can be visualised. A preferred card contains an opaque polyester substrate, an ink-receptive layer, and at least one transparent polyester cover layer having a heat-sealable or ink-receptive layer, whereby the card is formed by heat-sealing together the respective ink-receptive layers. A particularly preferred card is an all polyester film structure, having the general structure as described in EP-A-0497483, the disclosure of which is incorporated herein by reference. The opaque polyester support film and dye receptive or printable receiver film of EP-A-0497483 are equivalent to the polyester substrate and ink-receptive layer respectively of a multilayer card according to the present invention.

The multilayer card according to the present invention includes any of the multilayer structures disclosed in U.S. Pat. No. 5,407,893, the disclosure of which is incorporated herein by reference. The biaxially oriented polyester film and image receiving layer (numbers 3 and 1 respectively in FIGS. 6 to 13) of U.S. Pat. No. 5,407,893 are equivalent to the polyester substrate and ink-receptive layer respectively of a multilayer card according to the present invention.

The multilayer card according to the present invention can be used to form any of the card structures known in the art, including identification cards, magnetic cards such as credit cards and pre-paid cards, smart cards which may have an electronic chip at the surface or encapsulated, for example in epoxy material, inside the card (a so-called contactless smart card).

The multilayer card preferably has a thickness in the range from 150 to 1000 µm, more preferably 200 to 900 µm, particularly 250 to 850 µm, and especially 650 to 840 µm.

The multilayer card preferably has a length in the range from 70 to 100 mm, more preferably 80 to 90 mm, and particularly about 86 mm; and a width in the range from 40 to 70 mm, more preferably 50 to 60 mm, and particularly about 54.5 mm.

The multilayer card according to the present invention is preferably formed by a lamination process, by which is meant that two or more separate self-supporting film structures, which may themselves contain more than one layer, are brought together and joined by suitable means, including heat or adhesive, to form a card. An opaque polyester substrate having an ink-receptive layer on at least one surface thereof is a preferred first self-supporting film structure and a cover layer a preferred second self-supporting film structure.

For manufacturing purposes, it is generally desirable for a card comprising substrate, ink-receptive layer and cover layer to be coterminous along all edges. However, this is not always the case, and for example, the ink-receptive layer may cover only part of the substrate and the cover layer may be joined to the substrate in the regions where there is no ink-receptive layer, generally by means of an additional adhesive layer.

The layers of a multilayer card according to the present invention may, if desired, contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated as appropriate.

The invention is illustrated by reference to the following drawings in which.

Figure 1:
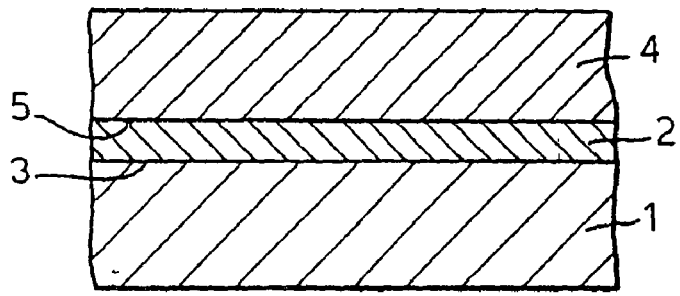
FIG. 1 is a schematic sectional elevation, not to scale, of a multilayer card having an opaque polyester film substrate, ink-receptive layer and cover layer.

Referring to FIG. 1 of the drawings, the multilayer card comprises an opaque polyester film substrate layer (1) having an ink-receptive layer (2) bonded to a first surface (3) of the substrate, and a transparent cover layer (4) bonded to the surface of the ink-receptive layer (5) remote from the substrate.

Figure 2:
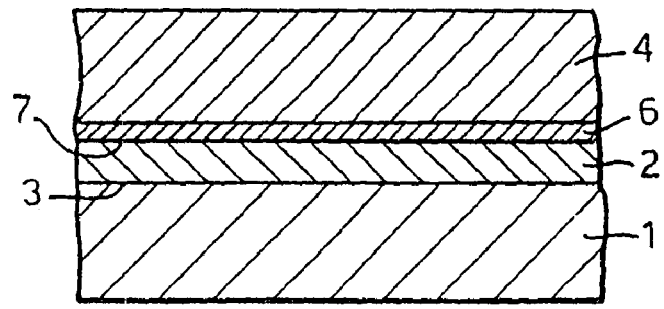
FIG. 2 is a similar schematic elevation of a multilayer card shown in FIG. 1, with an additional information carrying layer on the surface of the ink-receptive layer, underneath the cover layer.

The film of FIG. 2 additionally comprises an information carrying layer (6) on the surface (7) of the ink-receptive layer (2).

Figure 3:
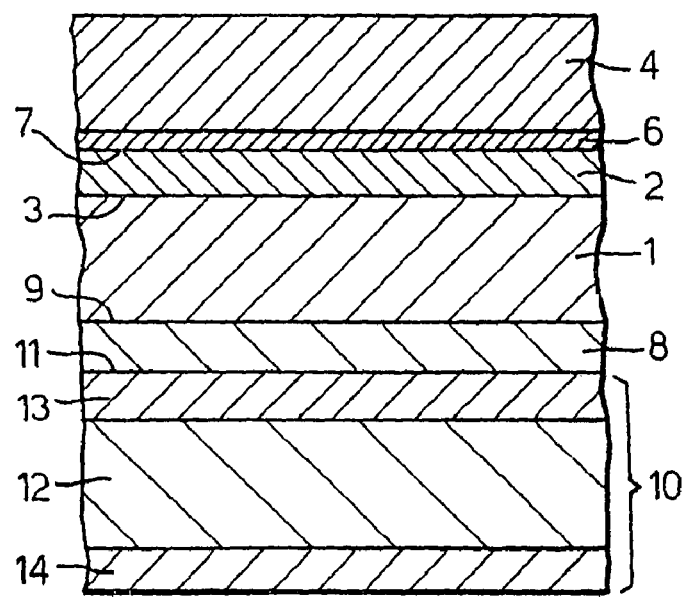
FIG. 3 is a similar schematic elevation of a multilayer card shown in FIG. 2, with an additional ink-receptive layer and cover layer, on the second side of the substrate.

The film of FIG. 3 additionally comprises a second ink-receptive layer (8) on the second surface (9) of the substrate layer (1), and a second cover layer (10) on the surface (11) of the second ink-receptive layer (8) remote from the substrate (1). The second cover layer (10) is a multilayer film comprising an opaque polyester substrate layer (12) having ink-receptive (or heat-sealable) layers (13 and 14) on both surfaces thereof.

In this specification the following test methods have been used to determine certain properties of the layers of the multilayer card and/or of the card itself:

(i) Transmission Optical Density (TOD)

TOD of the film was measured using a Macbeth Densitometer TD 902 (obtained from Dent and Woods Ltd, Basingstoke, UK) in transmission mode.

(ii) Whiteness Index and Yellowness Index

The whiteness index and yellowness index of the film was measured using a Colorgard System 2000, Model/45 (manufactured by Pacific Scientific) based on the principles described in ASTM D 313.

(iii) Heat-Seal Strength

A heat-seal was formed by positioning together and heating two ink-receptive layers present on opaque polyester substrate layers, at 140° C. for ten seconds under a pressure of 275 kPa (40 psi). The sealed film was cooled to room temperature, and the heat-seal strength determined by measuring the force required under linear tension per unit width of seal to peel the layers of the film apart at a constant speed of 4.23 mm/second.

(iii) Delamination Susceptibility

Delamination susceptibility was measured using the following edge impact test. A multilayer card of dimensions 86 mm×54.5 mm×750 (or 640) μm was held upright in the hand and uniformly hit 10 times by means of one of the corner edges of the card on to a wooden table. The card was then examined for delamination and scored as excellent (no delamination), good (small signs of delamination), or poor (total delamination—the layers of the card clearly separated and could be easily peeled apart).

The invention is further illustrated by reference to the following examples.

EXAMPLE 1

Separate streams of a substrate layer polymer of polyethylene terephthalate comprising 15% by weight, relative to the total weight of the substrate, of anatase titanium dioxide having a volume distributed median particle diameter of 0.7 μm, 8% by weight, relative to the total weight of the substrate, of Lomod ST4090A (copolyester ether, supplied by General Electric Corporation), and 460 ppm of optical brightener, and two outer ink-receptive layer polymers comprising a copolyester of 82 mole % ethylene terephthalate and 18 mole % ethylene isophthalate were supplied from separate extruders to a single channel coextrusion assembly. The polymer layers were extruded through a film-forming die onto a water cooled rotating, quenching drum to yield an amorphous cast composite extrudate. The cast extrudate was heated to a temperature of about 80° C. and then stretched longitudinally at a forward draw ratio of 3.2:1. The composite sheet was passed into a stenter oven, where the sheet was dried and stretched in the sideways direction to approximately 3.4 times its original dimensions. The biaxially stretched composite sheet was heat set at a temperature of about 225° C. Final film thickness of the composite sheet was 150 μm. The opaque substrate layer was 125 μm thick, the two outer ink-receptive layers were both 12.5 μm thick.

The composite sheet was subjected to the test procedures described herein and exhibited the following properties:

(i) Transmission Optical Density (TOD)=1.2.

(ii) Whiteness Index=96 units.

Yellowness Index=−0.9 units.

(III) Heat-Seal Strength=2000 $Nm^{-1}$.

Items (i) and (ii) are essentially properties of the opaque substrate layer, as the ink-receptive layers make little or no contribution thereto. Item (iii) is a property of the ink-receptive layers.

Five of the composite sheets produced above were press laminated together at a temperature of 150° C. for 90 seconds to form a laminated sheet of thickness 750 μm. Multilayer cards of dimensions 86 mm×54.5 mm were cut out from the laminated sheet, subjected to the edge impact test described herein and exhibited the following property:

(iv) Delamination Susceptibility=excellent (ie no delamination).

EXAMPLE 2

This is a comparative example not according to the invention.

The procedure of Example 1 was repeated except that Lomod ST4090A was omitted from the substrate layer composition. The multilayer cards of dimensions 86 mm×54.5 mm which were cut from the laminated sheet of thickness 750 μm were subjected to the edge impact test described herein; and exhibited the following property:

(iv) Delamination Susceptibility poor (ie total delamination– the layers of the card clearly separated and could be easily peeled apart).

EXAMPLE 3

The procedure of Example 1 was repeated except that Lomod TE3040A (copolyesterether, supplied by General Electric Corporation) was used instead of Lomod ST4090A. The multilayer cards of dimensions 86 mm×54.5 mm which were cut from the laminated sheet of thickness 750 μm were subjected to the edge impact test described herein and exhibited the following property:

(iv) Delamination Susceptibility=good (small signs of delamination).

EXAMPLE 4

The procedure of Example 1 was repeated except that the substrate contained a blue dye instead of optical brightener, had a single copolyester ink-receptive layer, and the surface of the monoaxially oriented polyethylene terephthalate substrate film was coated with an acrylic ink-receptive layer composition comprising the following ingredients:

| | |
|---|---|
| Acrylic resin | 163 ml |
| (46% w/w aqueous latex of methyl methacrylate/ethyl acrylate/methacrylamide: 46/46/8 mole %, with 25% by weight methoxylated melamine-formaldehyde) | |
| Ammonium nitrate | 6 ml |
| (10% w/w aqueous solution) | |
| Demineralised water | to 2.5 litres |

Final film thickness was 320 μm. The opaque polyester substrate layer was 295 μm thick, the copolyester ink-receptive layer was 25 μm thick, and the dry coat weight of the acrylic ink-receptive layer was approximately 0.04 μm.

The film exhibited the following properties:
(ii) Whiteness Index=96 units.
  Yellowness Index=−5.7 units.

Two of the composite sheets produced above were press laminated together at a temperature of 150° C. for 90 seconds to form a laminated sheet of thickness 640 μm. The multilayer cards of dimensions 86 mm×54.5 mm which were cut from the laminated sheet of thickness 640 μm were subjected to the edge impact test described herein and exhibited the following property:
(iv) Delamination Susceptibility=excellent (ie no delamination).

The invention claimed is:

1. A multilayer card comprising a first multilayer film structure, said multilayer film structure comprising:
   (i) an opaque polyester film substrate comprising in the range from 0.2 to 30% by weight relative to the total weight of the substrate, of at least one copolyesterether comprising at least one alkylene terephthalate;
   (ii) a first ink-receptive layer on a first surface of the substrate;
   (iii) a cover layer on the surface of the first ink-receptive layer; and
   (iv) a second ink-receptive heat-sealable layer comprising a polyester resin on a second surface of the substrate;
   wherein said second ink-receptive heat-sealable layer constitutes an outermost layer of the first multilayer film structure, and wherein the second ink-receptive heat-sealable layer is capable of forming a heat-seal bond to itself having a strength in a range from 300 to 3000 N/m when bonded for ten seconds at 140° C. and 275 kPa.

2. The multilayer card according to claim 1, wherein the substrate comprises in the range from 5 to 25% by weight, relative to the total weight of the substrate, of an inorganic filler.

3. The multilayer card according to claim 1, wherein the first ink-receptive layer comprises an acrylic resin.

4. The multilayer card according to claim 1, wherein the first ink-receptive layer comprises a polyester resin.

5. The multilayer card according to claim 1, further comprising a cover layer on the surface of the second ink-receptive layer.

6. The multilayer card according to claim 1, wherein the polyester substrate is uniaxially oriented.

7. The multilayer card according to claim 1, wherein the polyester substrate is biaxially oriented.

8. The multilayer card of claim 1, wherein the copolyesterether comprises at least one poly(alkylene oxide) glycol polyether block.

9. The multilayer card according to claim 1, wherein the cover layer is transparent and comprises a polyester.

10. The multilayer card according to claim 1 further comprising a second multilayer film structure, said second film structure comprising:
    (i) an opaque polyester film substrate comprising in the range from 0.2 to 30% by weight relative to the total weight of the substrate, of at least one copolyesterether comprising at least one alkylene terephthalate;
    (ii) a first ink-receptive layer on a first surface of the substrate;
    (iii) a cover layer on the surface of the first ink-receptive layer; and
    (iv) a second ink-receptive heat-sealable layer comprising a polyester resin on a second surface of the substrate;
    wherein said second ink-receptive heat-sealable layer constitutes an outermost layer of the second multilayer film structure, and wherein the second ink-receptive heat-sealable layer is capable of forming a heat-seal bond to itself having a strength in a range from 300 to 3000 N/m when bonded for ten seconds at 140° C. and 275 kPa; and
    wherein the heat-sealable layer of the first multilayer film structure is heat-sealably bonded to the heat-sealable layer of the second multilayer film structure.

11. A multilayer card comprising a first multilayer film structure said multilayer film structure comprising:
    (i) an opaque polyester film substrate comprising in the range from 0.2 to 30% by weight relative to the total weight of the substrate, of at least one copolyesterether comprising at least one poly(alkylene oxide) glycol polyether block;
    (ii) a first ink-receptive layer on a first surface of the substrate;
    (iii) a cover layer on the surface of the first ink-receptive layer; and
    (iv) a second ink-receptive heat-sealable layer comprising a polyester resin on a second surface of the substrate;
    wherein said second ink-receptive heat-sealable layer constitutes an outermost layer of the first multilayer film structure, and wherein the second ink-receptive heat-sealable layer is capable of forming a heat-seal bond to itself having a strength in a range from 300 to 3000 N/m when bonded for ten seconds at 140° C. and 275 kPa.

12. The multilayer card according to claim 11, wherein the substrate comprises in the range from 5 to 25% by weight, relative to the total weight of the substrate, of an inorganic filler.

13. The multilayer card according to claim 11, wherein the first ink-receptive layer comprises an acrylic resin.

14. The multilayer card according to claim 11, wherein the first ink-receptive layer comprises a polyester resin.

15. The multilayer card according to claim 11, further comprising a cover layer on the surface of the second ink-receptive layer.

16. The multilayer card according to claim 11, wherein the polyester substrate is uniaxially oriented.

17. The multilayer card according to claim 11, wherein the polyester substrate is biaxially oriented.

18. The multilayer card according to claim 11, wherein the cover layer is transparent and comprises a polyester.

19. The multilayer card according to claim 11 further comprising a second multilayer film structure, said second film structure comprising:
(i) an opaque polyester film substrate comprising in the range from 0.2 to 30% by weight relative to the total weight of the substrate, of at least one copolyesterether comprising at least one poly(alkylene oxide) glycol polyether block;
(ii) a first ink-receptive layer on a first surface of the substrate;
(iii) a cover layer on the surface of the first ink-receptive layer; and
(iv) a second ink-receptive heat-sealable layer comprising a polyester resin on a second surface of the substrate;
wherein said second ink-receptive heat-sealable layer constitutes an outermost layer of the second multilayer film structure, and wherein the second ink-receptive heat-sealable layer is capable of forming a heat-seal bond to itself having a strength in a range from 300 to 3000 N/m when bonded for ten seconds at 140° C. and 275 kPa; and
wherein the heat sealable layer of the first multilayer film structure is heat-sealably bonded to the heat-sealable layer of the second multilayer film structure.

20. A multilayer card comprising a first multilayer film structure said multilayer film structure comprising:
(i) an opaque polyester film substrate comprising in the range from 0.2 to 30% by weight relative to the total weight of the substrate, of at least one copolyesterether, said copolyesterether being a block copolymer comprising a polyester block as a hard segment and a polyether block as a soft segment,
(ii) a first ink-receptive layer on a first surface of the substrate;
(iii) a cover layer on the surface of the first ink-receptive layer; and
(iv) a second ink-receptive heat-sealable layer comprising a polyester resin on a second surface of the substrate;
wherein said second ink-receptive heat-sealable layer constitutes an outermost layer of the first multilayer film structure, and wherein the second ink-receptive heat-sealable layer is capable of forming a heat-seal bond to itself having a strength in a range from 300 to 3000 N/m when bonded for ten seconds at 140° C. and 275 kPa.

21. The multilayer card according to claim 20, wherein the substrate comprises in the range from 5 to 25% by weight, relative to the total weight of the substrate, of an inorganic filler.

22. The multilayer card according to claim 20, wherein the first ink-receptive layer comprises an acrylic resin.

23. The multilayer card according to claim 20, wherein the first ink-receptive layer comprises a polyester resin.

24. The multilayer card according to claim 20, further comprising a cover layer on the surface of the second ink-receptive layer.

25. The multilayer card according to claim 20, wherein the polyester substrate is uniaxially oriented.

26. The multilayer card according to claim 20, wherein the polyester substrate is biaxially oriented.

27. The multilayer card according to claim 20, wherein the cover layer is transparent and comprises a polyester.

28. The multilayer card according to claim 20 further comprising a second multilayer film structure, said second film structure comprising:
(i) an opaque polyester film substrate comprising in the range from 0.2 to 30% by weight relative to the total weight of the substrate, of at least one copolyesterether, said copolyesterether being a block copolymer comprising a polyester block as a hard segment and a polyether block as a soft segment;
(ii) a first ink-receptive layer on a first surface of the substrate;
(iii) a cover layer on the surface of the first ink-receptive layer; and
(iv) a second ink-receptive heat-sealable layer comprising a polyester resin on a second surface of the substrate;
wherein said second ink-receptive heat-sealable layer constitutes an outermost layer of the second multilayer film structure, and wherein the second ink-receptive heat-sealable layer is capable of forming a heat-seal bond to itself having a strength in a range from 300 to 3000 N/m when bonded for ten seconds at 140° C. and 275 kPa; and
wherein the heat sealable layer of the first multilayer film is heat-sealably bonded to the heat-sealable layer of the second multilayer film.

29. A multilayer card comprising a first multilayer film structure, said multilayer film structure comprising:
(i) an opaque polyester film substrate comprising in the range from 0.2 to 30% by weight relative to the total weight of the substrate, of at least one copolyesterether comprising at least one alkylene terephthalate;
(ii) a first ink-receptive layer on a first surface of the substrate;
(iii) a cover layer on the surface of the first ink-receptive layer; and
(iv) a second ink-receptive heat-sealable layer comprising a polyester resin on a second surface of the substrate;
wherein said second ink-receptive heat-sealable layer constitutes an outermost layer of the first multilayer film structure, and wherein the second ink-receptive heat-sealable layer comprises a copolyester having 50 to 90 mol % ethylene terephthalate content and 50 to 10 mol % ethylene isophthalate content.

30. The multilayer card according to claim 29, wherein the substrate comprises in the range from 5 to 25% by weight, relative to the total weight of the substrate, of an inorganic filler.

31. The multilayer card according to claim 29, wherein the first ink-receptive layer comprises an acrylic resin or a polyester resin.

32. The multilayer card according to claim 29, further comprising a cover layer on the surface of the second ink-receptive layer.

33. The multilayer card according to claim 29, wherein the polyester substrate is uniaxially or biaxially oriented.

34. The multilayer card of claim 29, wherein the copolyesterether comprises at least one poly(alkylene oxide) glycol polyether block.

35. The multilayer card according to claim 29, wherein the cover layer is transparent and comprises a polyester.

36. The multilayer card according to claim 29 further comprising a second multilayer film structure, said second film structure comprising:
(i) an opaque polyester film substrate comprising in the range from 0.2 to 30% by weight relative to the total weight of the substrate, of at least one copolyesterether comprising at least one alkylene terephthalate;
(ii) a first ink-receptive layer on a first surface of the substrate;
(iii) a cover layer on the surface of the first ink-receptive layer; and
(iv) a second ink-receptive heat-sealable layer comprising a polyester resin on a second surface of the substrate;

wherein said second ink-receptive heat-sealable layer constitutes an outermost layer of the second multilayer film structure, and wherein the second ink-receptive heat-sealable layer comprises a copolyester having 50 to 90 mol % ethylene terephthalate content and 50 to 10 mol % ethylene isophthalate content; and wherein the heat-sealable layer of the first multilayer film structure is heat-sealably bonded to the heat-sealable layer of the second multilayer film structure.

37. A multilayer card comprising a first multilayer film structure said multilayer film structure comprising:
   (i) an opaque polyester film substrate comprising in the range from 0.2 to 30% by weight relative to the total weight of the substrate, of at least one copolyesterether comprising at least one poly(alkylene oxide) glycol polyether block;
   (ii) a first ink-receptive layer on a first surface of the substrate;
   (iii) a cover layer on the surface of the first ink-receptive layer; and
   (iv) a second ink-receptive heat-sealable layer comprising a polyester resin on a second surface of the substrate;
wherein said second ink-receptive heat-sealable layer constitutes an outermost layer of the first multilayer film structure, and wherein the second ink-receptive heat-sealable layer comprises a copolyester having 50 to 90 mol % ethylene terephthalate content and 50 to 10 mol % ethylene isophthalate content.

38. The multilayer card according to claim 37, wherein the substrate comprises in the range from 5 to 25% by weight, relative to the total weight of the substrate, of an inorganic filler.

39. The multilayer card according to claim 37, wherein the first ink-receptive layer comprises an acrylic resin or a polyester resin.

40. The multilayer card according to claim 37, further comprising a cover layer on the surface of the second ink-receptive layer.

41. The multilayer card according to claim 37, wherein the polyester substrate is uniaxially or biaxially oriented.

42. The multilayer card according to claim 37, wherein the cover layer is transparent and comprises a polyester.

43. The multilayer card according to claim 37 further comprising a second multilayer film structure, said second film structure comprising:
   (i) an opaque polyester film substrate comprising in the range from 0.2 to 30% by weight relative to the total weight of the substrate, of at least one copolyesterether comprising at least one poly(alkylene oxide) glycol polyether block;
   (ii) a first ink-receptive layer on a first surface of the substrate;
   (iii) a cover layer on the surface of the first ink-receptive layer; and
   (iv) a second ink-receptive heat-sealable layer comprising a polyester resin on a second surface of the substrate;
wherein said second ink-receptive heat-sealable layer constitutes an outermost layer of the second multilayer film structure, and wherein the second ink-receptive heat-sealable layer comprises a copolyester having 50 to 90 mol % ethylene terephthalate content and 50 to 10 mol % ethylene isophthalate content; and
wherein the heat sealable layer of the first multilayer film structure is heat-sealably bonded to the heat-sealable layer of the second multilayer film structure.

44. A multilayer card comprising a first multilayer film structure said multilayer film structure comprising:
   (i) an opaque polyester film substrate comprising in the range from 0.2 to 30% by weight relative to the total weight of the substrate, of at least one copolyesterether, said copolyesterether being a block copolymer comprising a polyester block as a hard segment and a polyether block as a soft segment,
   (ii) a first ink-receptive layer on a first surface of the substrate;
   (iii) a cover layer on the surface of the first ink-receptive layer; and
   (iv) a second ink-receptive heat-sealable layer comprising a polyester resin on a second surface of the substrate;
wherein said second ink-receptive heat-sealable layer constitutes an outermost layer of the first multilayer film structure, and wherein the second ink-receptive heat-sealable layer comprises a copolyester having 50 to 90 mol % ethylene terephthalate content and 50 to 10 mol % ethylene isophthalate content.

45. The multilayer card according to claim 44, wherein the substrate comprises in the range from 5 to 25% by weight, relative to the total weight of the substrate, of an inorganic filler.

46. The multilayer card according to claim 44, wherein the first ink-receptive layer comprises an acrylic resin or a polyester resin.

47. The multilayer card according to claim 44, further comprising a cover layer on the surface of the second ink-receptive layer.

48. The multilayer card according to claim 44, wherein the polyester substrate is uniaxially or biaxially oriented.

49. The multilayer card according to claim 44, wherein the cover layer is transparent and comprises a polyester.

50. The multilayer card according to claim 44 further comprising a second multilayer film structure, said second film structure comprising:
   (i) an opaque polyester film substrate comprising in the range from 0.2 to 30% by weight relative to the total weight of the substrate, of at least one copolyesterether, said copolyesterether being a block copolymer comprising a polyester block as a hard segment and a polyether block as a soft segment;
   (ii) a first ink-receptive layer on a first surface of the substrate;
   (iii) a cover layer on the surface of the first ink-receptive layer; and
   (iv) a second ink-receptive heat-sealable layer comprising a polyester resin on a second surface of the substrate;
wherein said second ink-receptive heat-sealable layer constitutes an outermost layer of the second multilayer film structure, and wherein the second ink-receptive heat-sealable layer comprises a copolyester having 50 to 90 mol % ethylene terephthalate content and 50 to 10 mol % ethylene isophthalate content; and
wherein the heat sealable layer of the first multilayer film structure is heat-sealably bonded to the heat-sealable layer of the second multilayer film structure.

* * * * *